United States Patent
Zhou

(10) Patent No.: US 12,208,806 B2
(45) Date of Patent: Jan. 28, 2025

(54) METHOD FOR DETERMINING DRIVING PARAMETERS AND VEHICLE CONTROL APPARATUS

(71) Applicant: NIO TECHNOLOGY (ANHUI) CO., LTD, Hefei (CN)

(72) Inventor: Ping Zhou, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 273 days.

(21) Appl. No.: 17/698,128

(22) Filed: Mar. 18, 2022

(65) Prior Publication Data
US 2022/0306127 A1   Sep. 29, 2022

(30) Foreign Application Priority Data

Mar. 25, 2021   (CN) .......................... 202110318239.3

(51) Int. Cl.
*B60W 40/09*    (2012.01)
*B60W 30/08*    (2012.01)
(Continued)

(52) U.S. Cl.
CPC ............ *B60W 40/09* (2013.01); *B60W 30/08* (2013.01); *B60W 30/18163* (2013.01);
(Continued)

(58) Field of Classification Search
CPC ................. B60W 40/09; B60W 30/08; B60W 30/18163; B60W 60/001; B60W 50/0098;
(Continued)

(56) References Cited

U.S. PATENT DOCUMENTS

2010/0023223 A1* 1/2010 Huang .................. B60W 40/09
340/576
2019/0333381 A1* 10/2019 Shalev-Shwartz ... G05D 1/0214
(Continued)

FOREIGN PATENT DOCUMENTS

EP           3647136           5/2020

OTHER PUBLICATIONS

Extended Search Report for European Patent Application No. 22162770.6, dated Aug. 25, 2022, 7 pages.
(Continued)

*Primary Examiner* — Ig T An
(74) *Attorney, Agent, or Firm* — Sheridan Ross P.C.

(57) ABSTRACT

A method for determining driving parameters includes: acquiring driving data of a driver; extracting driving features of the driver based on the driving data, where the driving features include first operation frequency of a first component of a vehicle and second operation frequency of a second component of the vehicle; determining, based on the driving features, a first probability that the driver has a first driving style and a second probability that the driver has a second driving style; and determining the driving parameters based on the first probability and the second probability, where the driving parameters include at least longitudinal acceleration and longitudinal deceleration. The method can dynamically adjust automated driving parameters to meet the driving style of the driver, thereby effectively improving user experience.

18 Claims, 1 Drawing Sheet

(51) Int. Cl.
*B60W 30/18* (2012.01)
*B60W 60/00* (2020.01)

(52) U.S. Cl.
CPC ..... *B60W 60/001* (2020.02); *B60W 2520/105* (2013.01); *B60W 2540/10* (2013.01); *B60W 2540/12* (2013.01); *B60W 2554/00* (2020.02)

(58) Field of Classification Search
CPC ... B60W 2540/30; B60W 40/08; B60W 40/10
See application file for complete search history.

(56) References Cited

U.S. PATENT DOCUMENTS

2020/0122697 A1* 4/2020 Jang .................... B60T 8/174
2021/0107495 A1* 4/2021 Meng ................... B60W 40/09

OTHER PUBLICATIONS

Official Action for European Patent Application No. 22162770.6, dated Sep. 19, 2024, 5 pages.

* cited by examiner

METHOD FOR DETERMINING DRIVING PARAMETERS AND VEHICLE CONTROL APPARATUS

CROSS-REFERENCE TO RELATED APPLICATION

This application claims the benefit of China Patent Application No. 202110318239.3 filed Mar. 25, 2021, the entire contents of which are incorporated herein by reference in its entirety.

TECHNICAL FIELD

The invention relates to the field of automated driving technologies, and more particularly, to a method for determining driving parameters and a vehicle control apparatus.

BACKGROUND ART

With the development of artificial intelligence technologies, automobile manufacturers add an automated driving function as an important module to their products. However, in an existing automated driving function, drivers usually determine automated driving parameters through manual setting. With such a parameter setting method, it is difficult to dynamically adjust automated driving parameters based on driving styles and driving environments of drivers.

SUMMARY OF THE INVENTION

According to an aspect of the invention, a method for determining driving parameters is provided, which can dynamically adjust automated driving parameters.

For this purpose, the invention provides a technical solution as follows:

A method for determining driving parameters includes: acquiring driving data of a driver; extracting driving features of the driver based on the driving data, where the driving features include first operation frequency of a first component of a vehicle and second operation frequency of a second component of the vehicle; determining, based on the driving features, a first probability that the driver has a first driving style and a second probability that the driver has a second driving style; and determining the driving parameters based on the first probability and the second probability, where the driving parameters include at least longitudinal acceleration and longitudinal deceleration.

Optionally, the method further includes: performing an automated driving operation of the vehicle based on the driving parameters.

Optionally, the driving features of the driver further include third operation frequency of a steering wheel.

Optionally, the driving features of the driver further include an expected time for the vehicle to move to a recognizable target ahead.

Optionally, determining a style of the driver based on the driving features includes: calculating the first probability and the second probability by using a logistic regression model, where the logistic regression model is trained by using at least part of the driving features.

Optionally, determining the driving parameters based on comparison between the first probability and the second probability includes: determining a driving style corresponding to a larger probability in the first probability and the second probability; and determining the longitudinal acceleration and the longitudinal deceleration respectively as linear functions of an index number D corresponding to the determined driving style.

Optionally, the determining the driving parameters further includes: determining a constant speed during automated driving of the vehicle as $(k1*D+c1)*V_{max}$, where $V_{max}$ is a maximum speed limit on a current road section, and $k1$ and $c1$ are adjustment coefficients.

Optionally, the determining the driving parameters further includes: determining lane changing duration during automated lane changing of the vehicle as $(c2-c3*D)/V_t$, where $V_t$ is a vehicle speed during lane changing of the vehicle, and $c2$ and $c3$ are adjustment coefficients.

According to another aspect of the invention, a vehicle control apparatus is provided. The apparatus includes: a data acquisition module configured to acquire driving data of a driver; a feature extraction module configured to extract driving features of the driver based on the driving data, where the driving features include at least first operation frequency of a first component of a vehicle and second operation frequency of a second component of the vehicle; and a parameter setting module coupled with the feature extraction module and configured to determine, based on the driving features, a first probability that the driver has a first driving style and a second probability that the driver has a second driving style and determine the driving parameters based on the first probability and the second probability, where the driving parameters include at least longitudinal acceleration and longitudinal deceleration.

Optionally, the first component is an accelerator pedal, and the second component is a brake pedal.

Optionally, the feature extraction module is further configured to: acquire third operation frequency of a steering wheel; and determine an expected time for the vehicle to move to a recognizable target ahead.

The method for determining driving parameters provided in the invention can dynamically adjust, based on the driving data of the driver that is acquired in real time and by using a logistic regression algorithm, the automated driving parameters to meet the driving style and real-time requirements of the driver. With the introduction of a machine learning algorithm, the method can meet the requirements of an automated driving technology for rapidly evaluating the driving style of the driver and adjusting the driving parameters in real time, and has the advantages of being easy to implement and convenient to upgrade and maintain, thereby effectively improving user experience. The vehicle control apparatus provided in the invention can not only automatically adjust the driving parameters to meet the driving style of the driver, but also have good real-time performance, universality, deployment convenience, and low implementation costs.

DETAILED DESCRIPTION OF EMBODIMENTS

Specific details are presented in the following description in order to provide a thorough understanding of the invention. However, those skilled in the art will clearly know that embodiments of the invention can be implemented even without these specific details. In the invention, specific numerical references may be made, such as "first element", "second apparatus", and so on. However, specific numerical references should not be understood as having to comply with their literal order, but instead, it should be understood that "first element" and "second element" are different.

The specific details proposed by the invention are only exemplary, and the specific details may vary, but still fall within the spirit and scope of the invention. The term "couple" is defined to mean being directly connected to a component or indirectly connected to a component via another component. In addition, the terms "approximately" and "substantially" used herein for any value or range indicate that deviations are tolerated properly without affecting an implementation effect of the invention.

Hereinafter, preferred embodiments of the method, system, and apparatus suitable for implementing the invention will be described with reference to the accompanying drawings. Although the embodiments are described for a single combination of elements, it should be understood that the invention includes all possible combinations of the disclosed elements. Therefore, if one embodiment includes elements A, B, and C, and the second embodiment includes elements B and D, the invention should also be considered to include other remaining combinations of A, B, C, or D, even if not explicitly disclosed.

Figure 1:
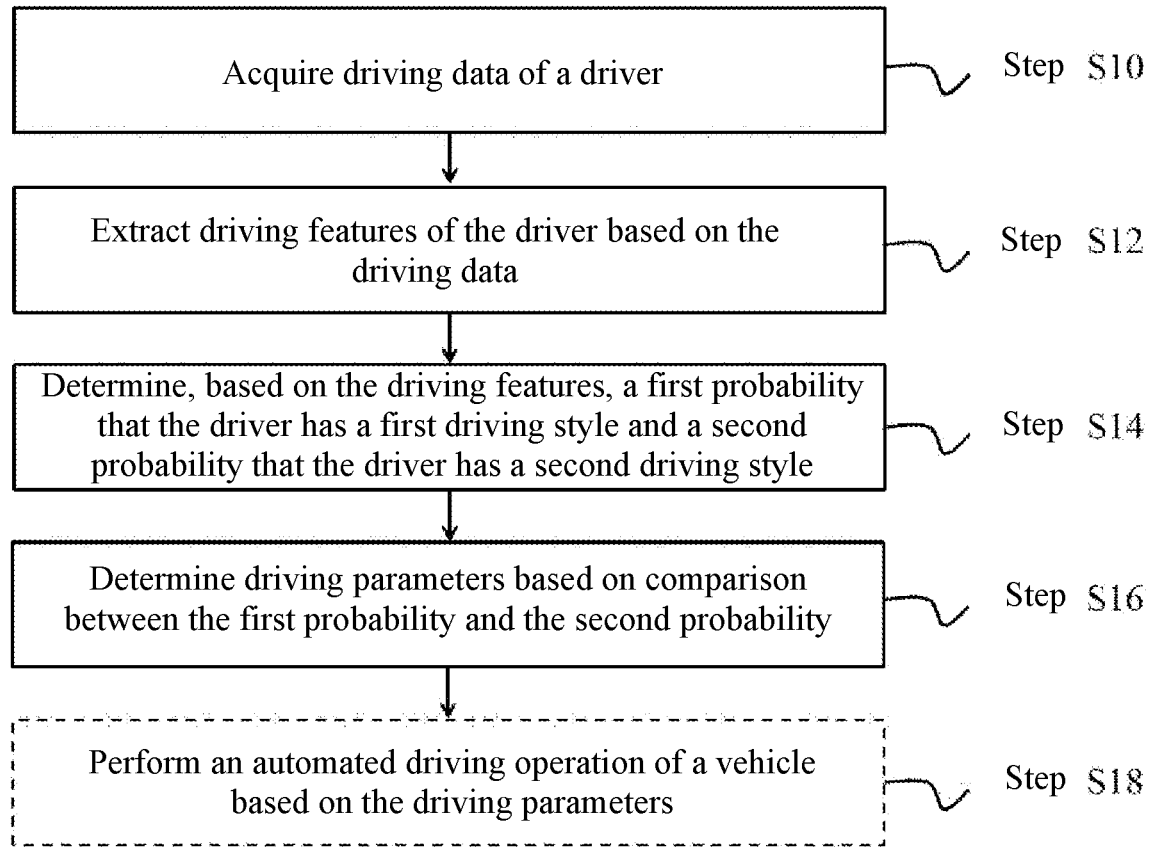
FIG. 1 is a schematic flowchart illustrating a method for determining driving parameters applied to a vehicle according to an embodiment of the invention.

According to an embodiment of the invention, a method for determining driving parameters applied to a vehicle is provided. As shown in FIG. 1, the method includes step S10, step S12, step S14, step S16, and optionally, step S18.

Step S10: driving data of a driver is acquired.

In this step, biological features of the driver may be recognized first to determine an identity of the driver, and driving data of each driver is independently stored. Therefore, in subsequent steps, the driving features of the current driver can be extracted and analyzed, and then driving parameters that matches the driver can be determined.

Because the driving data of the driver in a manual driving state during a normal traffic (for example, at a vehicle speed greater than or equal to 30 km/h) has a relatively high reference value for analysis of the driving features of the driver, the driving data of the driver can be acquired by using a vehicle sensor. The vehicle sensor includes a sensor for helping the vehicle to sense environments and objects outside and inside the vehicle. Common vehicle sensors include but are not limited to: an image capturing apparatus, a millimeter wave radar, an ultrasonic radar, a laser radar, an inertial measurement unit, a position sensor, a pressure sensor, and a rotating angular transducer. For the purpose of rapid response to and dynamic adjustment on automated driving parameters, a relatively short sampling time interval may be used to improve sampling precision, for example, an interval of 50 ms is used for real-time sampling.

In some embodiments, a type of driving data that needs to be acquired is selected based on configuration requirements of an automated driving system. The driving data includes but is not limited to: a vehicle speed, position data of an accelerator pedal, pressure data of a brake pedal, rotating angular data of a steering wheel, and a safe following distance, where the safe following distance includes a distance between the vehicle and a recognizable target ahead (such as a vehicle, person, or object ahead). In some other embodiments, the driving data may be classified based on road conditions and weather conditions to be used to extract driving features of the driver in specific situations and to be adapted to determine the driving parameters in specific situations.

Step S12: driving features of the driver are extracted based on the driving data.

Based on the driving data of the driver that is acquired in real time, the driving features of the current driver may be determined, where the driving features include different operation frequencies of different components of the vehicle by the driver. In some embodiments, based on an acquired extent (a position where the pedal is located or a pressure borne by the pedal) and/or acquired number of times by which the accelerator pedal or the brake pedal is stepped on by the driver, rapid acceleration frequency and rapid deceleration frequency of the driver may be determined as the driving features of the driver respectively. In some other embodiments, operation frequency (automatic gear shifting frequency) of a gearbox and/or operation frequency (first operation frequency) of a clutch by the driver, and intervention frequency (second operation frequency) of an active safety system and/or an electronic stability program may be determined as some driving features of the driver. It should be noted that, because the automatic gearbox, active safety system, and electronic stability program are operated (or started) by driving behaviors of the driver, their operation frequency, even being frequency of components or external modules of the vehicle, can reflect the driving features of the driver.

In some embodiments of the invention, the driving features of the driver further include operation frequency of a steering wheel by the driver. For example, frequency of rapidly turning the steering wheel by the driver may be determined based on the acquired angle and speed by which the driver turns the steering wheel. In some other embodiments, the driving features of the driver further include an expected time for the vehicle to move to a recognizable target ahead. The expected time reflects a field of view and a response speed of the driver, and sensitivity of the active safety system (if any). The expected time may be substantially determined based on the vehicle speed and the safe following distance.

The foregoing process of extracting the driving features of the current driver may include counting and calculation of various types of driving data. In an example, the following driving features are extracted: the rapid acceleration frequency, the rapid deceleration frequency, the frequency of rapidly turning the steering wheel, and the expected time for the vehicle to move to the recognizable target ahead. The process of counting and calculation is illustrated as follows:

Rapid acceleration frequency: The number of rapid acceleration times is counted during manual driving of the driver. The counting method is that when the accelerator pedal is stepped on by the driver to an extent more than 80% for a duration longer than 200 ms, 1 is added to the number of rapid acceleration times; and the number of rapid acceleration times is divided by a corresponding accumulated manual driving time, so that the rapid acceleration frequency $f_a$ can be calculated.

Rapid deceleration frequency: The number of rapid deceleration times is counted during manual driving of the driver. The counting method is that when the brake pedal is stepped on by the driver under the pressure more than 40 Bar for a duration longer than 200 ms, 1 is added to the number of rapid deceleration times; and the number of rapid deceleration times is divided by a corresponding accumulated manual driving time, so that the rapid deceleration frequency $f_b$ can be calculated.

Frequency of rapidly turning the steering wheel: The number of times of rapidly turning the steering wheel is counted during manual driving of the driver. The counting method is that when the vehicle is not turned or turned around and the steering wheel is turned by an angle more than 10 degrees for a duration longer than 2 fps, 1 is added to the number of times of rapidly turning the steering wheel, where the basis of determining that the vehicle is not turned or turned around is that the vehicle speed is greater than 0 and the steering wheel is turned in the same direction by an accumulated angle greater than or equal to 180 degrees within three seconds; and the number of times of rapidly turning the steering wheel is divided by a corresponding accumulated manual driving time, so that the frequency $f_s$ of rapidly turning the steering wheel can be calculated.

Expected time for the vehicle to move to the recognizable target ahead: In the presence of a target ahead during manual driving of the driver, a distance d between the driver and the target ahead and the current vehicle speed v are acquired, and the expected time ttc=d/v for the vehicle to move to the target ahead is calculated; and during such manual driving, an expected time ttc of the vehicle for each target ahead is counted, and an average value $\overline{ttc}$ is calculated.

Step S14: a first probability that the driver has a first driving style and a second probability that the driver has a second driving style are determined based on the driving features.

Before this step is performed, the first driving style and the second driving style may be defined first.

The following provides a specific example: When the driver drives the vehicle manually at a specific vehicle speed for a corresponding accumulated duration, for example, the driver drives the vehicle at a vehicle speed more than 30 km/h for an accumulated duration of two hours, the probabilities that the current driver has different driving styles may be determined based on the driving features calculated in step S12. A plurality of thresholds about the rapid acceleration frequency, the rapid deceleration frequency, and the frequency of rapidly turning the steering wheel may be predetermined. On this basis, the driving styles are classified into a conservative style, a common style, and an aggressive style. The probabilities that the driver has the three different driving styles are determined respectively by a machine learning method. For example, the probability that the driver has the driving style i may be calculated by using a logistic regression model. The calculation formula is shown as follows:

$$y_i = \frac{e^{(w_{1i}*f_a+w_{2i}*f_b+w_{3i}*f_s+w_{4i}*\overline{ttc}+w_{0i})}}{\sum_{k=1}^{3} e^{(w_{1i}*f_a+w_{2i}*f_b+w_{3i}*f_s+w_{4i}*\overline{ttc}+w_{0i})}}$$

where $y_i$ (i=1, 2, or 3) represents the probabilities of the conservative driving style, the common driving style, and the aggressive driving style respectively; and $w_{1i}$, $w_{2i}$, $w_{3i}$, and $w_{4i}$ (i=1, 2, or 3) are weight coefficients of the model, and $w_{0i}$=1, 2, or 3) is an intercept term of the model. The logistic regression model may be trained in advance by using at least part of the driving features determined in S12. The coefficients $w_{1i}$, $w_{2i}$, $w_{3i}$, $w_{4i}$, and $w_{0i}$ (i=1, 2, or 3) in the foregoing formula may all be obtained through training from the extracted driving feature data. For example, in the model training process, the driving feature data for training may be marked as a conservative type, a common type, and an aggressive type according to a predetermined standard before being imported into the model for training.

The logistic regression model constructs a functional relation between the probability that the driver has the driving style i and all the driving features of the driver and trains weights by using a maximum likelihood method. The logistic regression model is applicable to adjusting all the weight coefficients, and can also use different weight coefficients under different road conditions and weather conditions, so that automated driving parameters are applicable to meeting the driving style and specific requirements of the current driver and the current driving environment.

Step S16: the driving parameters are determined based on comparison between the first probability and the second probability.

In this step, the driving style of the driver may be determined by comparing the different probabilities of the different driving styles determined in step S14, so as to determine the corresponding driving parameters. In some embodiments of the invention, the largest probability in the different probabilities calculated in step S14 may be used as a basis for determining the driving style of the driver. For example, if the probability that the driver has the first driving style is calculated as 0.7 and the second probability of the second driving style is calculated as 0.3, it is determined that the driver has the first driving style. The determined driving style may be displayed on a vehicle display screen for the driver's reference, or uploaded to the cloud for data analysis in the background.

In some embodiments of the invention, the driving parameters include at least longitudinal acceleration and longitudinal deceleration, and may further include a constant speed and lane changing duration of the vehicle. The driving parameters may be used to plan automated driving of the vehicle and may also be used to assist the driver in performing a driving operation. For quantization of all the driving parameters, the index numbers D corresponding to the different driving styles may be defined. For example, when the driving style of the driver is an aggressive type, a common type, or a conservative type, index numbers D corresponding to the driving styles are 3, 2, and 1 respectively. The index numbers D of the driving styles may serve as specific parameter indicators for subsequently adjusting the automated driving parameters such as the longitudinal acceleration, the longitudinal deceleration, the constant speed, and the lane changing duration. The longitudinal acceleration is an important parameter for the automated driving system to control acceleration of the vehicle. The longitudinal deceleration is an important parameter for the automated driving system to control deceleration of the vehicle in the case of non-emergency braking. The constant speed may be used to determine a cruise constant speed of the vehicle during automated driving. The lane changing duration refers to a time consumed when the vehicle changes a lane during automated driving.

In some specific embodiments of the invention, the longitudinal acceleration and the longitudinal deceleration may be linear functions of the index number D of the driving style. For example, the longitudinal acceleration may be set to (0.03+0.015*D) g, and the longitudinal deceleration may be set to (−0.025−0.015*D) g, where g is gravitational acceleration. The cruise constant speed of the vehicle during automated driving may also be determined as (k1*D+c1)*$V_{max}$ based on the index number D of the driving style, where $V_{max}$ is a maximum speed limit on a current road section and may be obtained by using an onboard or mobile application high-definition map, and k1 and c1 are adjustment coefficients. In addition, the lane changing duration of the vehicle may be determined based on the vehicle speed $V_t$ during lane changing. The automated driving system controls lane changing actions of the vehicle based on the lane changing duration. The lane changing duration is also associated with the driving style. In an example, the lane changing duration may be determined as $(c2-c3*D)/V_t$, where c2 and c3 are adjustment coefficients.

The method for determining driving parameters can be used to determine the driving style of the driver and then adjust all the driving parameters in real time. During automated driving of the vehicle, intention and driving habits of the driver can be better met by using these driving parameters, thereby effectively improving user experience.

Figure 2:
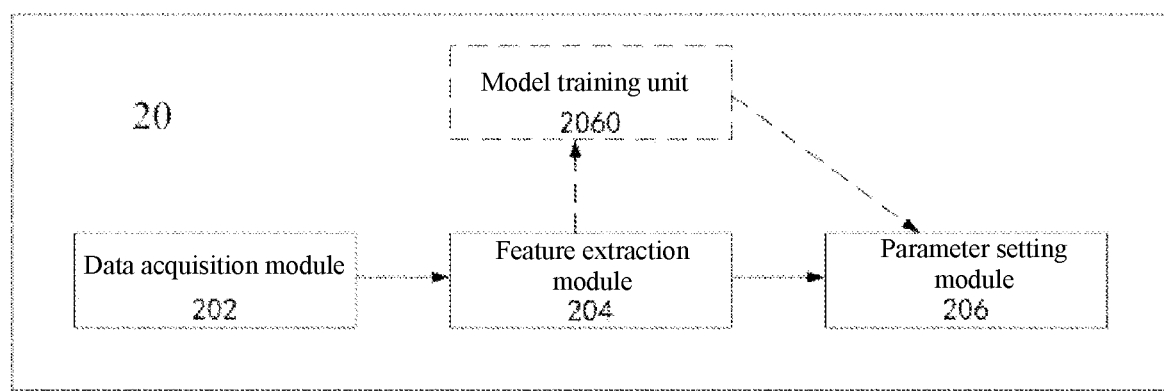
FIG. 2 is a schematic structural diagram illustrating modules of a vehicle control apparatus according to another embodiment of the invention.

Another embodiment of the invention provides a vehicle control apparatus 20. As shown in FIG. 2, the apparatus includes: a data acquisition module 202, a feature extraction module 204, a parameter setting module 206, and optionally, a model training unit 2060. All the modules may be coupled to each other as shown in FIG. 2. In some embodiments, the parameter setting module 206 may provide feedback information for the data acquisition module 202 and the feature extraction module 204.

The data acquisition module 202 is configured to acquire driving data of a driver, and includes a plurality of vehicle sensors for helping the vehicle to sense environments and objects outside and inside the vehicle and acquiring the data. The data acquisition module 202 may use a relatively short sampling time interval to improve sampling precision.

The feature extraction module 204 is configured to extract the driving features of the driver based on the driving data, where the driving features include different operation frequencies of different components of the vehicle by the driver. In some embodiments of the invention, the feature extraction module 204 may calculate rapid acceleration frequency and rapid deceleration frequency of the driver respectively based on an acquired extent and acquired number of times by which the accelerator pedal or the brake pedal is stepped on by the driver. In some other embodiments, the feature extraction module 204 further calculates operation frequency of the steering wheel by the driver and an expected time for the vehicle to move to a recognizable target ahead. For example, the expected time for the vehicle to move to the recognizable target ahead may be determined based on the acquired safe following distance and vehicle speed.

The parameter setting module 206 is configured to determine different probabilities of different driving styles of the driver based on the extracted driving features. In some embodiments of the invention, the parameter setting module 206 calculates the probabilities of the different driving styles of the driver by using a logistic regression model. Before the probabilities are calculated, the parameter setting module 206 trains (optimizes) the logistic regression model by using at least part of the driving features extracted by the feature extraction module 204, and may also test (verify) the logistic regression model by using another part of the driving features. In the model training process, the feature extraction module 204 may import, according to specific predetermined marks, a combination of the input driving features into the model for training and obtain corresponding weight coefficients.

The parameter setting module 206 is further configured to determine the driving style of the driver by comparing the different probabilities of the different determined driving styles of the driver, so as to determine (quantify) the automated driving parameters such as the longitudinal acceleration, the longitudinal deceleration, the constant speed, and the lane changing duration.

In some embodiments of the invention, the vehicle control apparatus may be implemented by using a group of distributed computing apparatuses connected to a communication network or be implemented based on "cloud". For example, the data acquisition module is disposed on a vehicle side, the parameter setting module is disposed on the cloud, the acquired driving data is uploaded from the vehicle side to the cloud, and the determined driving parameters are transmitted from the cloud to the vehicle side. Still referring to FIG. 2, the model training unit 2060, as a subunit of the parameter setting module 206, is disposed on the cloud, the acquired driving data is uploaded from the vehicle side to the cloud, the model training unit 2060 trains the model, and the determined model weight parameters are transmitted from the cloud to the vehicle side. In such an apparatus, a plurality of distributed computing apparatuses operate together, so that shared resources of the distributed computing apparatuses are used to provide service. The implementation based on the "cloud" can provide one or more advantages, including: openness, flexibility, extensibility, centralized management, reliability, scalability, and the like.

According to some embodiments of the invention, a non-transitory readable storage medium is further provided, storing a group of machine executable instructions, where when the machine executable instructions are executed by a processor, all the steps of the foregoing method for determining driving parameters applied to a vehicle may be implemented.

Those skilled in the art can understand that various descriptive logical blocks, modules, circuits, algorithm steps described with reference to the aspects disclosed in this specification may be implemented as electronic hardware, computer software, or a combination thereof. To demonstrate interchangeability between the hardware and the software, various descriptive parts, blocks, modules, circuits, and steps above have been described comprehensively based on their functionalities. Whether to implement these functionalities as hardware or software depends on specific application and design constrains imposed on an overall system. Those skilled in the art may implement the described functionalities for specific and particular application based on manners of change. However, determination of such an implementation should not be understood as a departure from the scope of the invention.

The foregoing description is only provided for preferred embodiments of the invention and is not intended to limit the scope of protection of the invention. Those skilled in the art may make various variation designs without departing from the concept and appended claims of the invention.

The invention claimed is:

1. A method for determining driving parameters performed in a vehicle control apparatus, the method comprising:
   a) acquiring driving data of a driver by at least one sensor;
   b) extracting driving features of the driver based on the driving data, wherein the driving features comprise first operation frequency of a first component of a vehicle and second operation frequency of a second component of the vehicle;
   c) determining, based on the driving features, a first probability that the driver has a first driving style and a second probability that the driver has a second driving style;
   d) determining the driving parameters based on the first probability and the second probability, wherein the driving parameters comprise at least longitudinal acceleration and longitudinal deceleration, wherein step d) comprises:
determining a driving style corresponding to a larger probability in the first probability and the second probability; and
determining the longitudinal acceleration and the longitudinal deceleration respectively as linear functions of an index number D corresponding to the driving style as determined, wherein step d) further comprises:
determining lane changing duration during automated lane changing of the vehicle as $(c2-c3*D)/Vt$, where Vt is a vehicle speed during lane changing of the vehicle, D is the index number, and c2 and c3 are adjustment coefficients; and
performing an automated driving operation of the vehicle based on the driving parameters.

2. The method of claim 1, wherein the first component is an accelerator pedal, and the second component is a brake pedal.

3. The method of claim 1, wherein the driving features further comprise third operation frequency of a steering wheel.

4. The method of claim 1, wherein the driving features further comprise an expected time for the vehicle to move to a recognizable target ahead.

5. The method of claim 1, wherein step c) comprises:
calculating the first probability and the second probability by using a logistic regression model, wherein the logistic regression model is trained by using at least part of the driving features.

6. The method of claim 1, wherein step d) further comprises:
determining a constant speed during automated driving of the vehicle as $(k1*D+c1)*Vmax$, where Vmax is a maximum speed limit on a current road section, and k1 and c1 are adjustment coefficients.

7. A vehicle control apparatus, comprising:
at least one sensor configured to acquire driving data of a driver;
at least one processor; and
at least one storage apparatus storing a group of machine executable instructions, wherein the instructions are adapted to be loaded and executed by the processor to perform:
extracting driving features of the driver based on the driving data, wherein the driving features comprise at least first operation frequency of a first component of a vehicle and second operation frequency of a second component of the vehicle;
determining, based on the driving features, a first probability that the driver has a first driving style and a second probability that the driver has a second driving style;
determining driving parameters based on the first probability and the second probability, wherein the driving parameters comprise at least longitudinal acceleration and longitudinal deceleration,
wherein the determining of the driving parameters is performed by:
determining a driving style corresponding to a larger probability in the first probability and the second probability; and
determining the longitudinal acceleration and the longitudinal deceleration respectively as linear functions of an index number D corresponding to the driving style as determined,
wherein the determining of the driving parameters is further performed by:
determining lane changing duration during automated lane changing of the vehicle as $(c2-c3*D)/Vt$, where Vt is a vehicle speed during lane changing of the vehicle, D is the index number, and c2 and c3 are adjustment coefficients; and
causing the vehicle to perform an automated driving operation based on the driving parameters.

8. The vehicle control apparatus of claim 7, wherein the first component is an accelerator pedal, and the second component is a brake pedal.

9. The vehicle control apparatus of claim 7, further comprising:
acquire third operation frequency of a steering wheel; and
determine an expected time for the vehicle to move to a recognizable target ahead.

10. The vehicle control apparatus of claim 7, further comprising:
train a logistic regression model by using at least part of the driving features; and
calculate the first probability and the second probability by using the logistic regression model.

11. The vehicle control apparatus of claim 7, wherein the vehicle control apparatus is deployed based on a cloud computing system.

12. A non-transitory readable storage medium, storing a group of machine executable instructions, wherein when the machine executable instructions are executed by a processor, a method for determining driving parameters is implemented, and the method comprises:
a) acquiring driving data of a driver by at least one sensor;
b) extracting driving features of the driver based on the driving data, wherein the driving features comprise first operation frequency of a first component of a vehicle and second operation frequency of a second component of the vehicle;
c) determining, based on the driving features, a first probability that the driver has a first driving style and a second probability that the driver has a second driving style;
d) determining the driving parameters based on the first probability and the second probability, wherein the driving parameters comprise at least longitudinal acceleration and longitudinal deceleration,
wherein step d) comprises:
determining a driving style corresponding to a larger probability in the first probability and the second probability; and
determining the longitudinal acceleration and the longitudinal deceleration respectively as linear functions of an index number D corresponding to the driving style as determined,
wherein step d) further comprises:
determining lane changing duration during automated lane changing of the vehicle as $(c2-c3*D)/Vt$, where Vt is a vehicle speed during lane changing of the vehicle, D is the index number, and c2 and c3 are adjustment coefficients; and
causing the vehicle to perform an automated driving operation based on the driving parameters.

13. The vehicle control apparatus of claim 7, wherein the driving features further comprise an expected time for the vehicle to move to a recognizable target ahead.

14. The vehicle control apparatus of claim 7, wherein the determining of the driving parameters is further performed by:
   determining a constant speed during automated driving of the vehicle as (k1*D+c1)*Vmax, where Vmax is a maximum speed limit on a current road section, and k1 and c1 are adjustment coefficients.

15. The non-transitory readable storage medium of claim 12, wherein the first component is an accelerator pedal, and the second component is a brake pedal.

16. The non-transitory readable storage medium of claim 12, wherein the driving features further comprise third operation frequency of a steering wheel.

17. The non-transitory readable storage medium of claim 12, wherein the driving features further comprise an expected time for the vehicle to move to a recognizable target ahead.

18. The non-transitory readable storage medium of claim 12, wherein the determining the driving parameters is further performed by:
   determining a constant speed during automated driving of the vehicle as (k1*D+c1)*Vmax, where Vmax is a maximum speed limit on a current road section, and k1 and c1 are adjustment coefficients.

* * * * *